United States Patent
Rappenecker et al.

[11] Patent Number: 5,847,523
[45] Date of Patent: Dec. 8, 1998

[54] METHOD OF LIMITING CURRENT IN A DC MOTOR AND DC MOTOR SYSTEM FOR IMPLEMENTING SAID METHOD

[75] Inventors: Hermann Rappenecker, Vöhrenbach; Roland Dieterle, St. Georgen, both of Germany

[73] Assignee: Papst-Motoren GmbH & Co. KG, St. Georgen, Germany

[21] Appl. No.: 645,579

[22] Filed: May 14, 1996

[30] Foreign Application Priority Data

May 25, 1995 [DE] Germany .................. 195 19 248.6

[51] Int. Cl.⁶ ....................................... H02H 5/04
[52] U.S. Cl. .................... 318/434; 318/254; 361/31; 361/101
[58] Field of Search .................. 318/432–434, 318/254, 439, 138, 778, 806, 810, 811; 361/23, 31, 93, 94, 95, 97, 101

[56] References Cited

U.S. PATENT DOCUMENTS

| | | | |
|---|---|---|---|
| 4,174,496 | 11/1979 | McFall et al. | 323/235 |
| 4,562,389 | 12/1985 | Jundt et al. | 318/432 |
| 4,581,711 | 4/1986 | Hirata et al. | 318/434 X |
| 4,628,235 | 12/1986 | Goings | 318/430 |
| 4,767,976 | 8/1988 | Mutoh et al. | 318/808 |
| 4,809,122 | 2/1989 | Fitzner | 361/18 |
| 4,943,888 | 7/1990 | Jacob et al. | 361/96 |
| 4,945,298 | 7/1990 | Nakashima | 318/434 X |
| 5,270,622 | 12/1993 | Krause | 318/254 |
| 5,280,222 | 1/1994 | von der Heide et al. | 318/138 |
| 5,400,206 | 3/1995 | Barnes | 361/72 |
| 5,490,031 | 2/1996 | Braun et al. | 361/93 |
| 5,621,603 | 4/1997 | Adamec et al. | 361/154 |

FOREIGN PATENT DOCUMENTS

| | | |
|---|---|---|
| 0 536 113B1 | 4/1993 | European Pat. Off. |
| 3338 764 A1 | 5/1985 | Germany |
| WO 89/01255 | 2/1989 | WIPO |
| WO 90/15473 | 12/1990 | WIPO |

OTHER PUBLICATIONS

Derwent WPI abstract of DE 33 38 764–A1, Haubner/Bosch.

Patent Abstracts of Japan, vol. 5, No. 23 (E–45), Feb. '81, abstracting JP 55–150 798–A, Takeshi Shioda/Toyo Denki K.K.

Derwent WPI abstract of DE–OS 40 28 089–A1, Albrecht et al.

Derwent WPI abstract of DE–OS 44 41 372–A1, Jeske et al. (=USSN 08/341,380).

Microchip Technology, Inc., *PIC16C5X EPROM–Based 8–bit CMOS Microcontroller Series*, 1994, pp. 11–60.

Motorola, Inc., *Motorola Semiconductor Master Selection Guide Revision 7*, 1994, 1994, pp. 4.3–4 through 4.3–8.

*Primary Examiner*—Brian Sircus
*Attorney, Agent, or Firm*—Milton Oliver; Ware, Fressola, Van Der Sluys & Adolphson LLP

[57] ABSTRACT

The invention relates to a method of current limitation in a direct current motor, with the following steps: in successive cycles, the motor is turned on at a predetermined place in the cycle and, after lapse of a predetermined time interval, the motor current is tested in a first test and, if found to be too high, the current is shut off; after lapse of another interval measured from the first test, the motor current is tested again during the same cycle and, if found to be too high, is shut off if it was not shut off previously; after lapse of a third interval, measured from the second test, the motor current is turned on, insofar as it was shut off at either of the two tests, and the cycle is repeated.

17 Claims, 8 Drawing Sheets

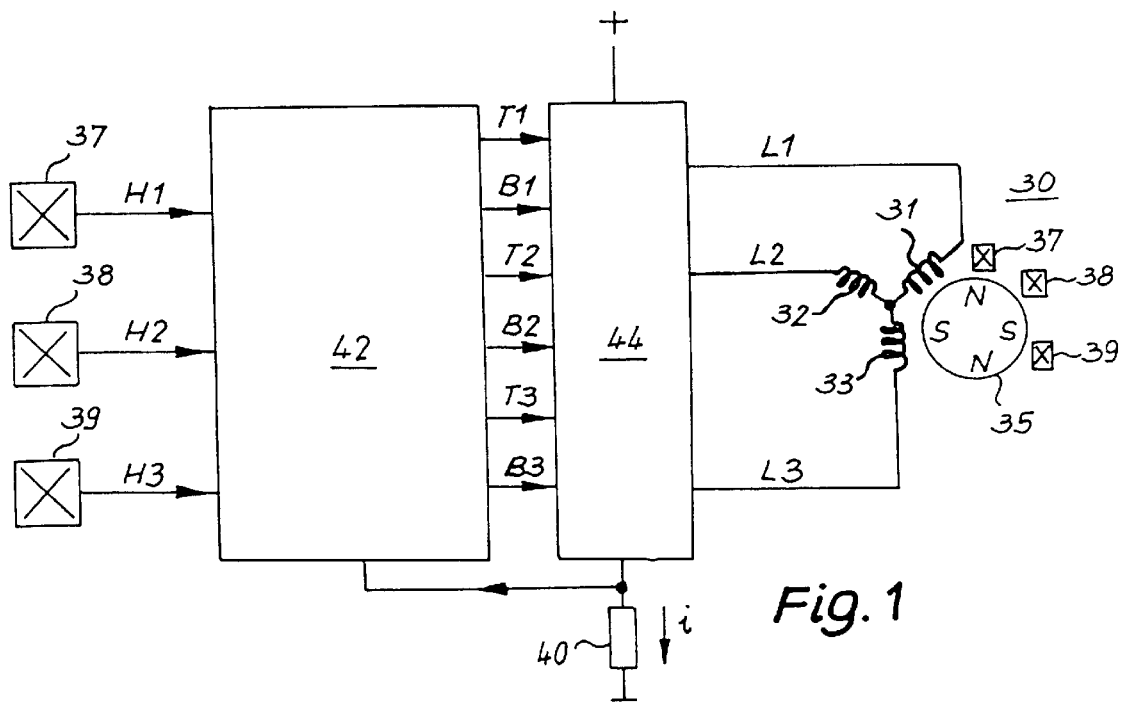
Fig. 1
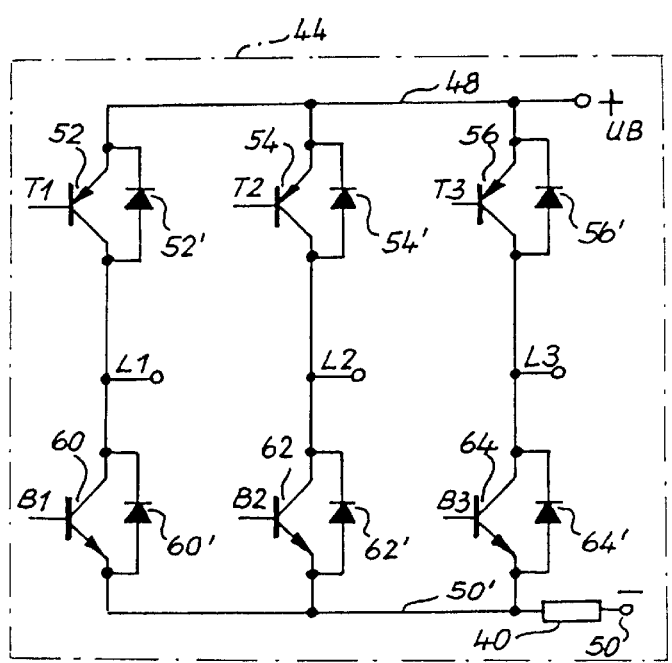
| |
|---|
| T1 = H1 · $\overline{H2}$ |
| B1 = $\overline{H1}$ · H2 |
| T2 = H2 · $\overline{H3}$ |
| B2 = $\overline{H2}$ · H3 |
| T3 = $\overline{H1}$ · H3 |
| B3 = H1 · $\overline{H3}$ |
Fig. 2a
Fig. 2b

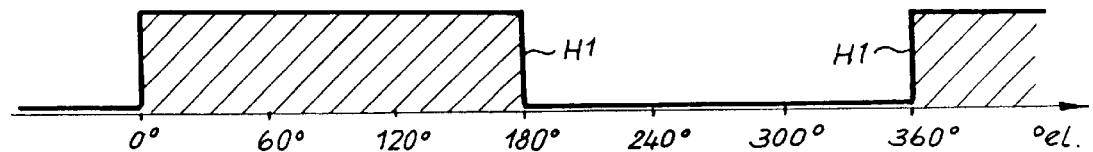
Fig. 3a
Fig. 3b
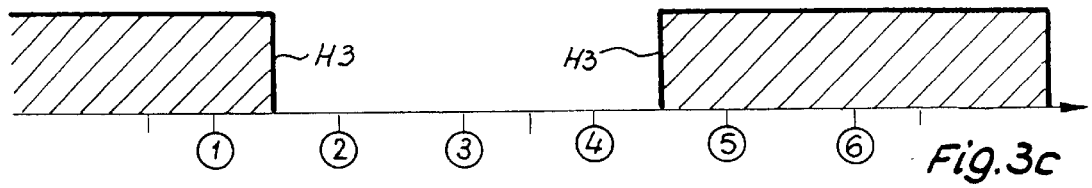
Fig. 3c
Fig. 3d
| H1 | 1 | 1 | 1 | 0 | 0 | 0 | 1 |
| H2 | 0 | 0 | 1 | 1 | 1 | 0 | 0 |
| H3 | 1 | 0 | 0 | 0 | 1 | 1 | 1 |
| T1 = H1·H2/ | ON | ON | OFF | OFF | OFF | OFF | ON |
| B1 = H1/·H2 | OFF | OFF | OFF | ON | ON | OFF | OFF |
| T2 = H2·H3/ | OFF | OFF | ON | ON | OFF | OFF | OFF |
| B2 = H2/·H3 | ON | OFF | OFF | OFF | OFF | ON | ON |
| T3 = H1/·H3 | OFF | OFF | OFF | OFF | ON | ON | OFF |
| B3 = H1·H3/ | OFF | ON | ON | OFF | OFF | OFF | OFF |
Fig. 3e

METHOD OF LIMITING CURRENT IN A DC MOTOR AND DC MOTOR SYSTEM FOR IMPLEMENTING SAID METHOD

CROSS-REFERENCE TO RELATED DOCUMENTS

German patent application P 44 41 372.6, filed Nov. 21, 1994;

German patent applications 195 15 944.6 of May 2, 1995, and 195 17 665.0 of May 13, 1995, and corresponding U.S. application Ser. No. 08/638,916, filed Apr. 25, 1996, RAPPENECKER (US Attorney docket 46310-1446MO).

FIELD OF THE INVENTION

The present invention relates generally to limitation of current in a DC motor and, more particularly, to a relatively inexpensive microprocessor-based control circuit for this purpose.

BACKGROUND

There are various methods for performing such current limitation. For example, an existing setting or control signal can be "chopped" by a current limitation circuit into smaller partial pulses. However, this can result in superimposed frequencies or harmonics, which lead to undesired noises and radio interference.

Also, during commutation processes, one can suppress particular signal blocks whenever the motor current goes too high. This method is used, for example, in the MOTOROLA model MC 33034 motor controller. However, this gives rise to current dropoffs which exacerbate the ripple in the torque of the motor and lead to strong, load-dependent noise formation, especially if the stator windings of the particular motor have a low inductance.

SUMMARY OF THE INVENTION

It is therefore an object of the present invention to provide a new method for current limitation in a DC motor.

Briefly, this is achieved, in accordance with the invention, in a DC motor, by the following steps: in successive cycles of essentially constant temporal duration, the motor current is switched on each time at a predetermined point of the cycle and, at a predetermined time interval after the switch-on, it is sampled and, if higher than a predetermined value, interrupted; at a predetermined time interval after the first sampling, the motor current, if it was not interrupted after the first sampling, is sampled a second time within the same cycle and, if higher than a predetermined value, interrupted; at a predetermined time after the second sampling, the motor current is switched back on, insofar as it was not switched off at either of the samplings, and the cycle is repeated.

One thereby obtains a kind of coarse control of the duty ratio of the current flowing through the motor: if this current is high, the duty ratio becomes small; if it is not so high, the duty ratio becomes greater. The frequency of the current pulses created by the current limitation circuit can be set so high that it lies at or above the upper boundary of the human auditory spectrum. The detection of stator currents by means of a microprocessor is, in principle, known from European Patent 0 536 113 B. It serves, in this known arrangement, for detection of the rotor position without use of a rotor position sensor.

In many cases, a startup with maximum possible torque of a motor is required. In this case, according to an advantageous refinement of the invention, in connection with the switch-on of the motor, the sampling of the motor current is deactivated during a predetermined number of rotor rotations or during a predetermined span of time, in order to deactivate the limitation of current directly after the switch-on of the motor and thereby enable a startup with maximum current and maximum torque.

The present invention further relates to a DC motor with a current limitation circuit, for interrupting the current through the motor, upon exceeding of a predetermined upper threshold or limit value of measured motor current. The current limitation circuit operates cyclically, in order to, at a first sampling instant within a cycle, at a predetermined time interval after switch-on of the motor current, interrupt this current if it exceeds the aforementioned upper limit value; in order to, at a second sampling instant within this cycle, which instant is a predetermined time interval after the first sampling instant, interrupt the motor current if it exceeds the upper limit value; and, in order finally to, at a predetermined time interval from the second sampling instant, begin a new cycle and, insofar as the motor current was switched off during the now-completed cycle, switch it on anew. Such a motor can be very economically manufactured, and the current limitation works in a very satisfactory manner.

Further details and advantageous refinements of the invention will be apparent from the following description of a preferred embodiment, which is intended as exemplary only, and not as a limitation of the invention to the structure shown.

BRIEF FIGURE DESCRIPTION

FIG. 1 is a block diagram of an embodiment of a DC motor with current limitation;

FIG. 2B is a detail of the full bridge circuit portion of the FIG. 1 motor, and FIG. 2A is a table of logic equations for generating the control signals T1 etc. applied to the circuit of FIG. 2B;

FIG. 3a, FIG. 3b, and FIG. 3c are signal diagrams, drawn to a common time scale, of the three Hall sensor output signals generated during operation of the motor of FIG. 1;

FIG. 3d is summarizes the logical values at various rotor positions; and

Figure 4:
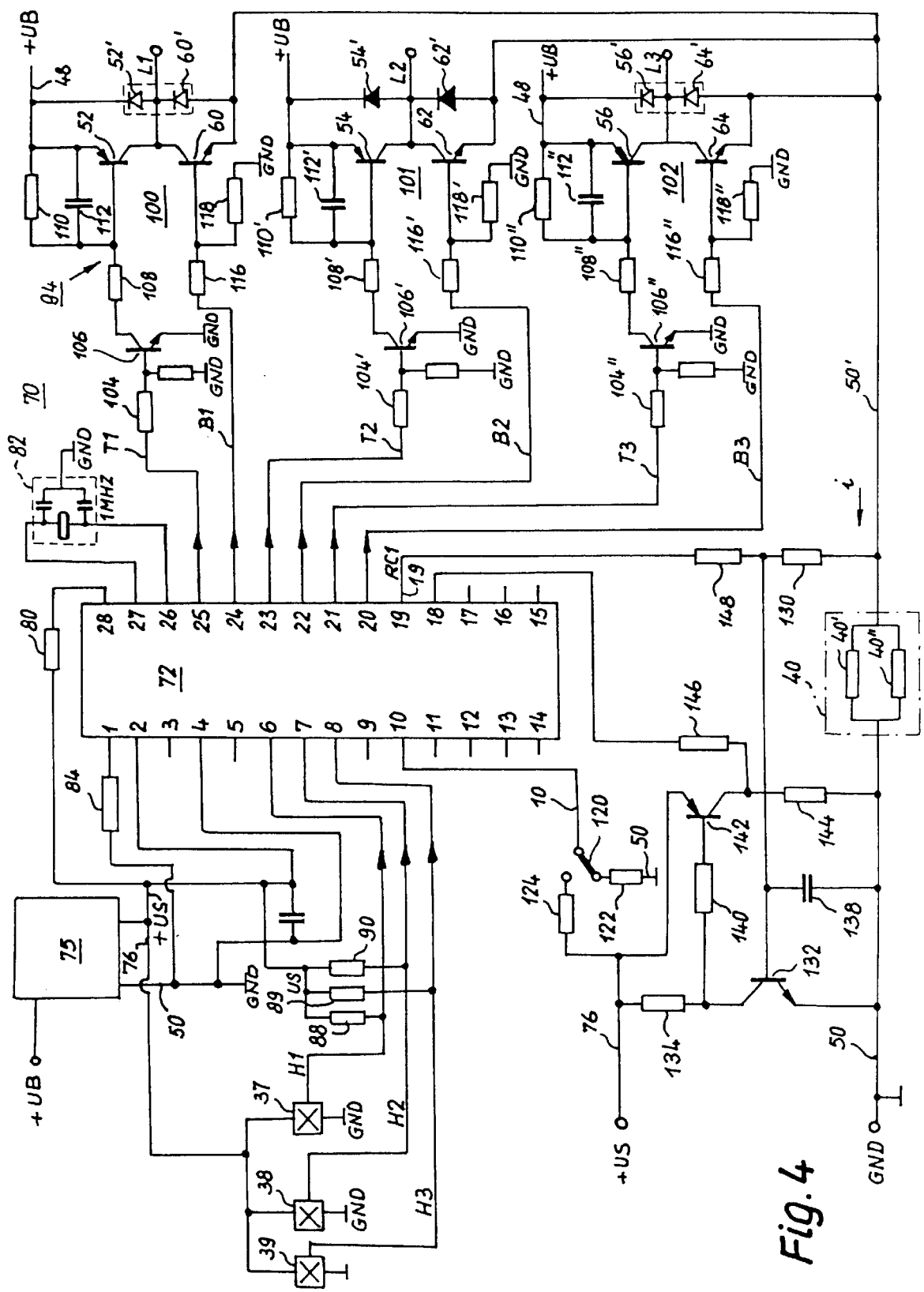
Figure 5:
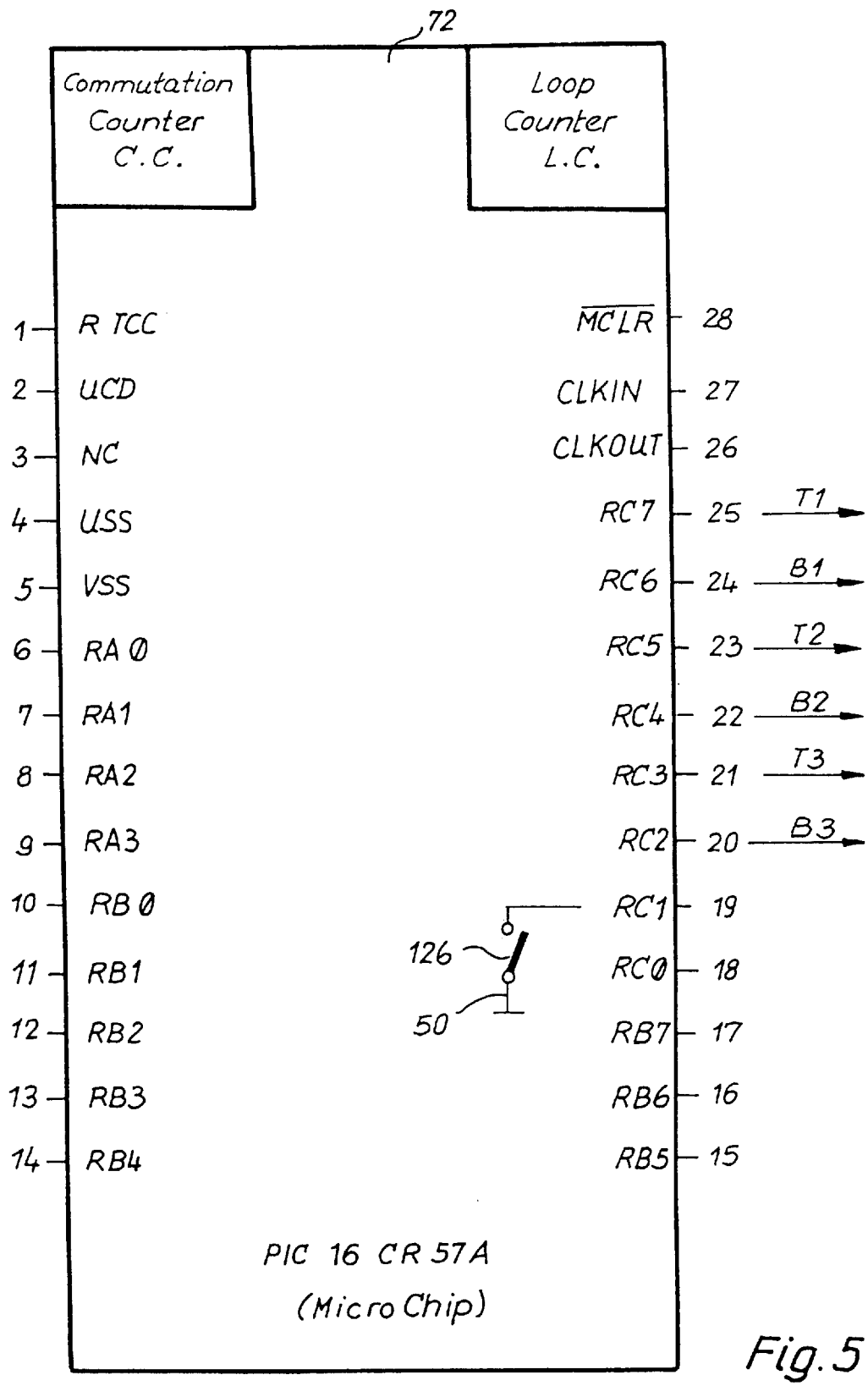
Figure 6A:
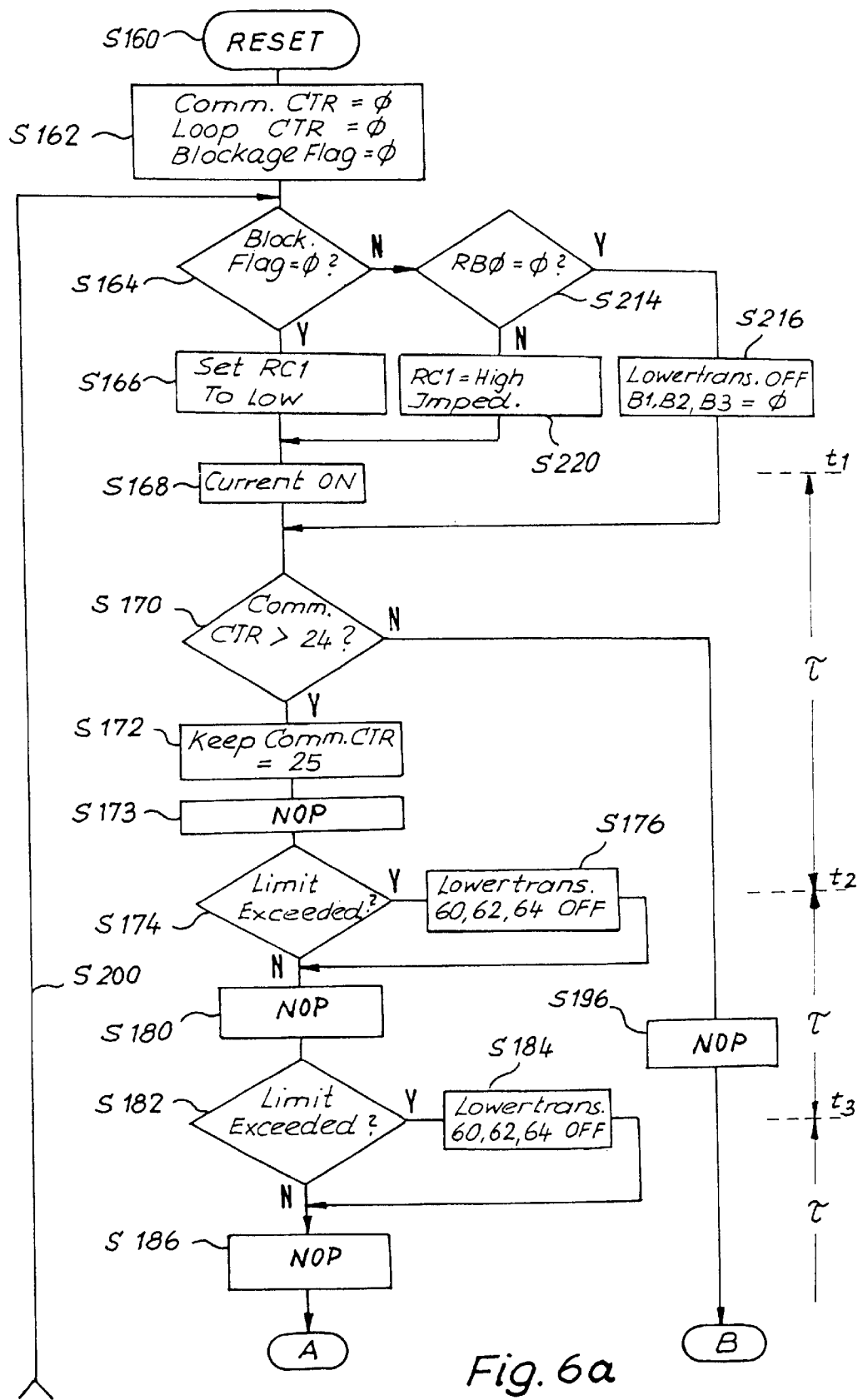
Figure 6B:
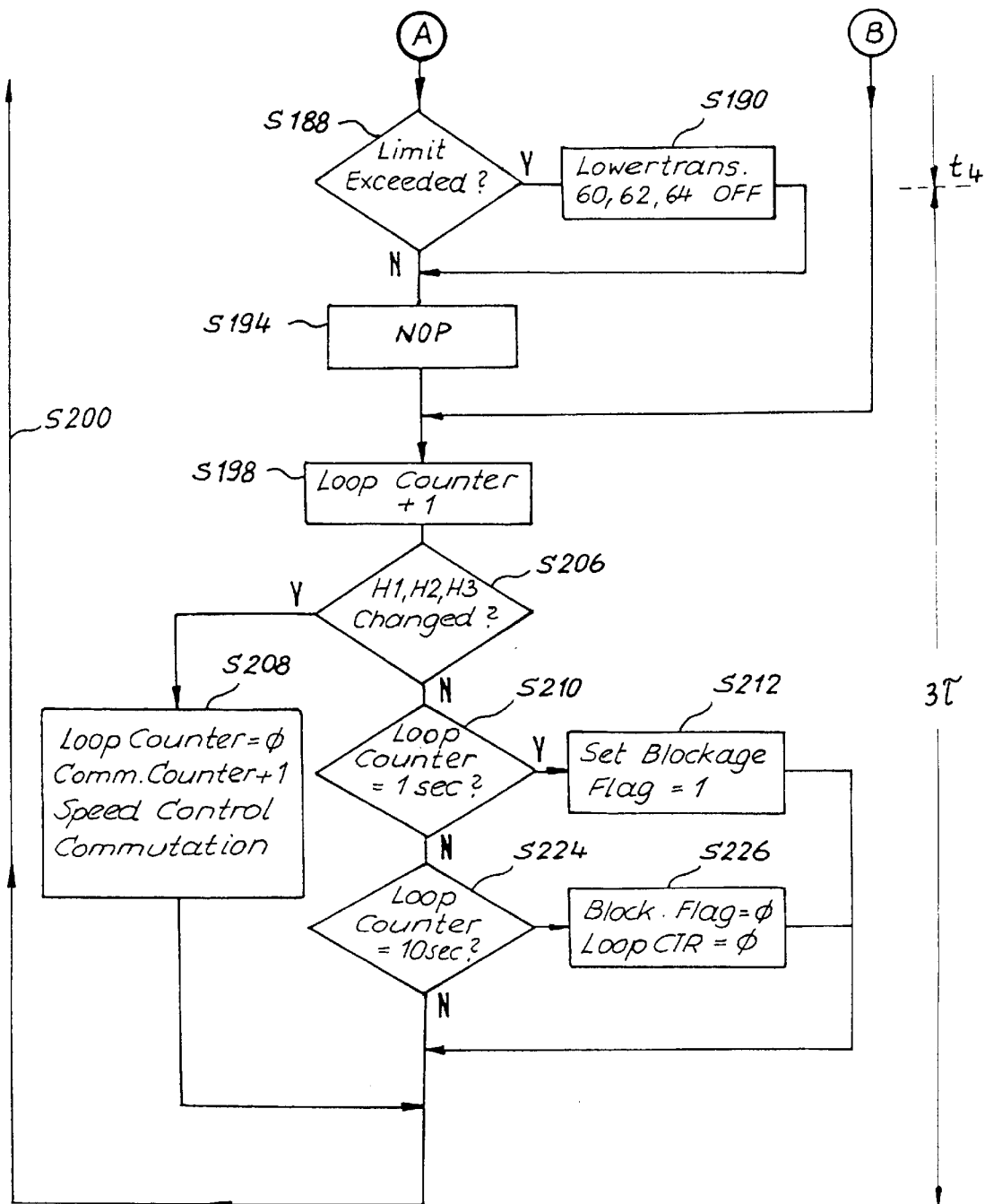
Figure 8A:
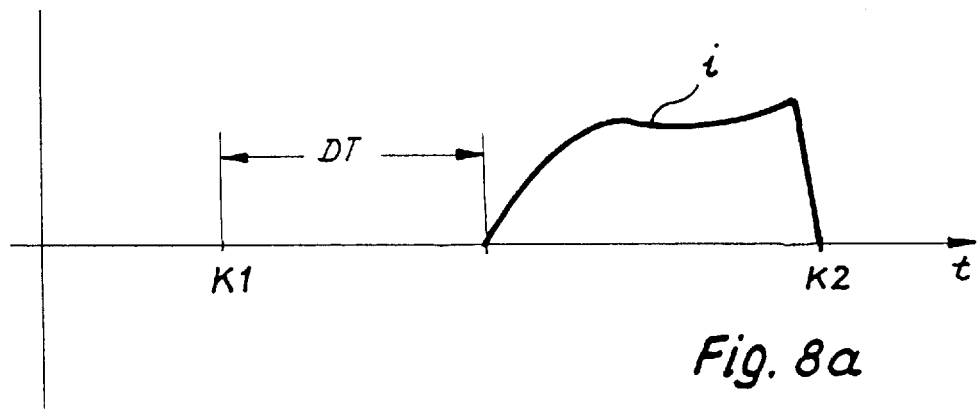
Figure 8B:
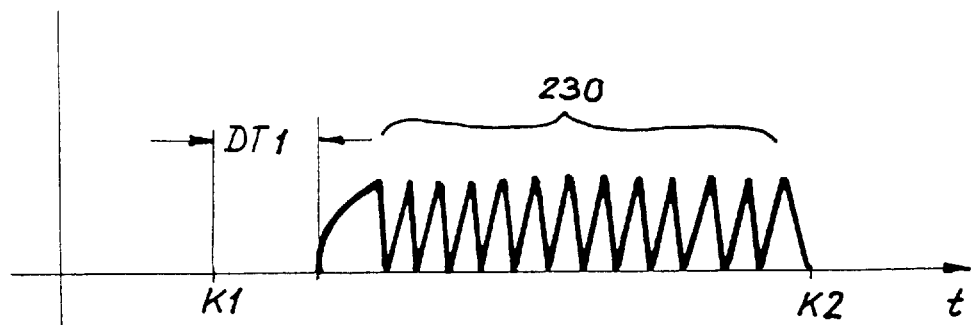

FIG. 3e sets forth the course of signals T1 etc. for the various rotor positions illustrated;

FIG. 4 is a circuit diagram of a preferred embodiment of the invention;

FIG. 5 is a diagram showing the pinout of a preferred microprocessor, PIC 16 CR 57A from Microchip Technology, Inc., used in the circuit of FIG. 4;

FIGS. 6A–6B are a flowchart which explains the operation of the circuit of FIG. 4;

FIGS. 7a–7d are signal graphs, drawn to a common time scale, illustrating operation of the circuit of FIGS. 4–6;

FIGS. 8a–8b are signal graphs, schematically illustrating operations of the motor.

DETAILED DESCRIPTION

FIG. 1 is a schematic block diagram of a three-stranded Electronically Commutated Motor 30 ("ECM") according to the prior art, which is a preferred application for the improvement of the present invention. The motor 30 has a stator winding with three strands 31, 32, 33, whose terminals are designated L1, L2 and L3. These three strands, which are also called phases, are shown here connected in a star configuration, but could equally well be connected in a triangle configuration. The permanent magnet rotor of motor 30 is symbolically designated 35, and around it on the stator are arranged three rotor position sensors 37, 38, and 29 at intervals of 120 degrees (el.). Since the rotor 35 illustrated is quadrupolar, 120 degrees (el.) corresponds to 60 degrees (mechanical). These sensors are generally Hall ICs, which provide an essentially digital output signal, i.e. either the value "0" or the value "1." To the extent that different sensors are used, their output signals can be digitized in a known manner.

These sensors 37, 38, and 39 are shown again at left in FIG. 1. Their respective output signals are designated H1, H2, and H3, and are fed to a commutation control circuit 42, which generates signals T1, B1, T2, B2, T3, B3, which are fed to a full bridge circuit 44, to which the terminals L1, L2, and L3 of windings 31, 32, and 33 are connected. The current i through this full bridge circuit 44 is detected using a measuring resistor 40 and the current signal is fed, as shown, to commutation control circuit 42.

FIG. 2B is a schematic illustration of the structure of bridge circuit 44 with bipolar transistors. Naturally, one could also use, in an identical manner, MOSFETs (Metal Oxide Semiconductor Field Effect Transistors), Darlington transistors, and the like. A positive conductor with the potential +UB (e.g. +40 V) is designated 48 and a negative conductor with the potential 0 V (GND) is designated 50. The three upper bridge transistors 52, 54, and 56 are PNP transistors, and a respective free-running diode 52', 54' or 56' is connected anti-parallel to each of them, in the manner shown. The emitter of each is connected to positive conductor 48, and the collector is connected to one of terminals L1, L2 and L3. At their bases, these three upper transistors receive respectively the signals T1, T2, and T3, as indicated in FIG. 2A. For example, if Hall IC 37has the output signal H1=1, and Hall IC 38 has the output signal 0, then transistor 52 is conductive and transistors 54 and 56 are blocked.

The lower transistors 60, 62, and 64 are NPN transistors; their emitters are connected via the common current measuring resistors 40 to the negative conductor 50, their collectors are connected respectively to the outputs L1, L2, L3, and to each, a respective free-running diode 60', 62', 64' is anti-parallel connected. At their bases, these lower transistors receive the respective signals B1, B2, and B3, as shown in FIG. 2B. FIG. 2A requires no further explanation.

It need not be stressed, that this is only an exemplary embodiment, and that the invention is equally adapted for use with DC motors having collectors, or for electronically commutated motors with other numbers of winding strands and other structures.

FIGS. 3a, 3b, and 3c show the three sensor signals H1, H2, H3, which are displaced or staggered 120 degrees (el.) with respect to each other. The numbering is so chosen that H1 at angle 0 deg. (el.) goes from "0" to "1", at angle 180 deg. (el.) from "1" to "0", and at 360 deg. (el.) again from "0" to "1," i.e. whenever rotor 35 turns 360 deg. (el.), there result the signals shown in FIGS. 3a, 3b, and 3c. The function of these signals is to provide, to commutation control circuit 42, information as to which rotational position rotor 35 is currently in, so that the correct transistors in the full bridge circuit can be turned on.

For the rotational position range 0 deg. (el.) to 60 deg. (el.), for example, the three sensors provide the signal combination H1, H2, H3=101, as shown in FIG. 3d, and this signal combination has the effect, in accordance with FIG. 3e, that signals T1 and B2 go high, i.e. that in bridge circuit 44, the transistors 52 and 62 are turned on, so that a current flows from positive conductor 48 via transistor 52, the strands 31 and 32, and the transistor 62, to negative conductor 50.

In the subsequent rotational position range 61 deg. (el.) to 120 deg. (el.)., the rotor position information reads H1,H2, H3=100 and this has the effect that signals T1 and B3 go high, whereby transistors 52 and 64 become switched on, and a current flows via strand 31 and strand 33 from the positive conductor to the negative conductor.

FIG. 4 is a circuit diagram of a motor arrangement 70 in accordance with the invention. The actual motor 30 is the same three-stranded, six-pulse, motor as in FIG. 1. Due to space constraints, it is not shown again in FIG. 4; rather, it is indicated by the terminals L1, L2 and L3 at right in FIG. 4.

The arrangement 70 according to FIG. 4 uses a microprocessor ($\mu$P) 72 which is shown enlarged in FIG. 5. FIG. 5 illustrates the pins (terminals) 1 through 28 of this microprocessor 72 and their designations (chosen by the manufacturer, Microchip Technology, Inc.), and the reader is referred to the datasheets therefor, for further information. The $\mu$P 72 also contains a ROM (Read Only Memory), in which the control program used is stored, and a RAM (Random Access Memory) for storage of volatile data, e.g. limit values for a counter, etc. This $\mu$P 72 is a RISC (Reduced Instruction Set Computer) processor. Naturally, here various microprocessors could be used; the main objective is to use an economical microprocessor with low power consumption, which can tolerate the temperatures in an electric motor. (The $\mu$P 72 is usually built directly into the housing of the motor, and forms a component of the latter.)

For power supply of $\mu$P 72, starting from positive conductor 48, there serves a regulated power supply 75, at whose output 76, a voltage +US of, e.g. 5V, is provided. Negative conductor 50 is partially designated also as GND. Input pin 2 of microprocessor 72 is directly connected to this output 76, and input 28 is connected via a resistor 80. As shown, a quartz oscillator 82 (e.g. 4 Mhz) is connected to pins 26 and 27, and serves as clock generator for microprocessor 72. Input pin 4 is directly connected to negative conductor 30, while input 1 is connected to it via a resistor 84, e.g. 100 k$\Omega$. The output of Hall IC 37 is connected to input pin 6 and furnishes signal H1 to pin 6. The output of Hall IC 38 is connected to pin 7 and furnishes signal H2. The output of Hall IC 39 is connected to pin 8 and furnishes signal H3.

The current inputs of Hall ICs 37, 38 and 39 are connected to each other, and to output 76 of voltage regulator 75. Alternatively, these Hall ICs could be furnished with current from an output of microprocessor 72, e.g. with current pulses having a duration of a few microseconds and a time spacing of, e.g., 50 to 150 microseconds. Through such current pulses, the Hall ICs 37, 38 and 39 would be always only temporarily switched on, and would briefly provide signals H1, H2, and H3 which would be stored in microprocessor 72 until the next current pulse, to be replaced at the next current pulse by the then-arising new signals H1, H2, H3. This sort of interrogation or sampling is the subject matter of German patent application 195 15 944.6 of May 2, 1995, and corresponding U.S. application Ser. No. 08/638, 916, filed Apr. 25, 1996, RAPPENECKER, the disclosure of which is incorporated by reference. Input pins 6, 7, and 8 are connected to output 76 of voltage regulator 75 via respective resistors 88, 89, and 90 (e.g 22 k$\Omega$ each), which are known as "pull-up" resistors.

During operation, output pin 25 of microprocessor 72 furnishes the signal T1, output pin 24 furnishes the signal B1, output pin 23 furnishes the signal T2, output pin 22 furnishes the signal B2, output pin 21 furnishes the signal T3, and output pin 20 furnishes the signal B3, as shown in FIG. 4. These signals serve, as shown in FIG. 2B, for control of the full bridge circuit 94, whose principal structure corresponds to FIG. 2B, i.e. the signals T1, B1, etc. are calculated in exactly the same way from the signals H1, H2, and H3, as was already described in detail with reference to FIGS. 1 through 3.

The full bridge circuit 94 of FIG. 4 has the same principal structure as the full bridge circuit 44 of FIG. 2B. Therefore, for equivalent or functionally equivalent elements, the same reference numerals have been used, and these elements are generally not described again.

As FIG. 4 shows, the bridge circuit 94 has three parts 100, 101, and 102 with identical structures. Therefore, the following describes only part 100. The corresponding components of part 101 have the same reference numeral with an apostrophe added; the corresponding components of part 102 have two apostrophes added, thus, e.g. 104' and 104".

Signal T1 is applied, via a resistor 104, to the base of NPN transistor 106, whose emitter is connected to negative conductor 50 (GND) and whose collector is connected via a resistor 108 to the base of PNP transistor 52. The emitter of transistor 52 is connected to its base via a resistor 110 (e.g. 4.7 kΩ) and via a parallel-connected capacitor 112 (e.g. 1 Nf). Resistor 110 and capacitor 112 form an RC element and slow down the switching processes of transistor 52, in order to reduce shutoff spikes and generation of radio interference.

In the same manner, signal T2 is fed via resistor 104' to the base of transistor 106', and signal T3 is fed via resistor 104" to the base of transistor 106".

Whenever the signal T1 at output 25 of microprocessor 72 takes on the logical value "1", transistor 106 becomes conductive and applies a base current to upper bridge transistor 52, so that the latter becomes conductive. Conversely, when signal T1 goes low (takes on the value logical "0"), the transistors 106 and 52 block.

The same applies, analogously, for the signal T2 at output 23, or the signal T3 at output 21, of microprocessor 72.

Signal B1 from microprocessor 72 is fed via a resistor 116 (e.g. 4.7 kΩ) directly to the base of transistor 60. This, in turn, is connected via a resistor 118 (e.g. 4.7 kΩ) to negative conductor 50.

Whenever signal B1 at output 24 of microprocessor 72 takes on the logical value "1", transistor 60 becomes conductive, and when it takes on the logical value "0", the transistor blocks. The same applies for signals B2 and B3, which requires no explanation, since the arrangements are the same in structure.

With small-capacity motors, one can use, for the bridge transistors, very inexpensive types, e.g. BC807-40 for the upper bridge transistors 52, 54, and 56, and BC817-40 for the lower bridge transistors 60, 62, and 64.

Input 10 (RBO) of microprocessor 72 can be connected via a two-pole switch 120—as shown—alternately via a resistor 122 with negative conductor 50 or via a resistor 124 with the regulated positive voltage 76. In this manner, input pin 10 can take on either logical value "0" or logical value "1."

The illustrated position of switch 120 (RBO=0) has the result that when motor 30 "blocks", i.e. when turning of rotor 35 is prevented, the motor current is shut off, and, as appropriate, new starting attempts are made within predetermined intervals by short-term turn-ons of the motor current.

The other position of switch 120 (signal RBO=1) has the result that, upon blocking, motor 30 is switched over to a lower current, i.e. the motor receives, when switched on but stationary, a lower current than it would receive when switched on and beginning to run. Thereby, the motor generates, even though stationary, a torque, albeit a relatively small one. This can be an advantage in many drives, in order to maintain a constant torque on the motor shaft.

Further, as shown in FIG. 5, terminal 19 (RC1) of microprocessor 72 can be connected, via an internal switch 126, with negative conductor 50, corresponding to the signal RC1=0. If switch 126 is opened, RC1 becomes high-impedance. The use of this switchover process is described below. Upon start-up, RC1=0, i.e. internal switch 126 is then closed. This internal switch is naturally a transistor of microprocessor 72.

The current sensing resistor 40 of FIG. 4 is formed by two parallel-connected resistors 40' and 40", each 6.8 ohms. These connect between negative conductor 50 and a line 50' which leads to the emitters of transistors 60, 62, and 64.

Line 50' is connected via a resistor 130 (e.g. 1.6 kΩ) to the base of an NPN transistor 132 (e.g. type BC847C), whose emitter is connected to negative conductor 50 and whose collector is connected via a resistor 134 with the regulated voltage 76. Between the base of transistor 132 and its emitter is a capacitor 138 (e.g. 1 Nf).

The collector of transistor 132 is connected via a resistor 140 to the base of a PNP transistor 142, whose emitter is connected to the regulated voltage 76 and whose collector is connected via a resistor 144 (e.g. 22 kΩ) to negative conductor 50, and via a resistor 146 (e.g. 22 kΩ) to terminal 18 (RCO) of microprocessor 72. The base of transistor 132 is connected via a resistor 148 (e.g. 1 kΩ) to terminal 19 (RC1) of microprocessor 72. This terminal RC1 is, as already described, switchable by means of internal switch 126.

OPERATION OF CURRENT SENSING CIRCUIT WITH TRANSISTORS 132 AND 142

During operation of motor 30, there arises a motor current i which flows through resistors 40' and 40", across which there is a voltage drop.

Upon start-up, as previously described, internal switch 126 is closed. This means that there is applied, to the base of transistor 132, only about half the voltage which is created by motor current i on resistors 40' and 40" (assuming that resistors 130 and 148 have about equal values). This means that current limitation first becomes effective at a relatively high motor current i, e.g. upon exceeding 350 mA, i.e. only in this case does transistor 132 become conductive. Thereby, via resistor 140, transistor 142 also becomes conductive. This has the effect that terminal RCO of microprocessor 72, which hitherto was connected via resistors 144, 146 to negative conductor 50 and therefore assumed its potential, now becomes connected by conductive transistor 142 to the regulated positive voltage at terminal 76. For microprocessor 72, this represents the signal that the current limit (e.g. 350 mA has been exceeded, and this triggers corresponding steps or processes, as described in detail below, with reference to flowchart FIG. 6.

Once internal switch 126 opens, terminal RC1 becomes high-impedance. The entire voltage at resistors 40', 40" is thereby applied to the base-emitter path of transistor 132. In this case, a smaller current i, e.g. 150 mA, suffices in order to bring transistors 132 and 142 into conduction, so that the signal RCO becomes "1" and the current is thereafter limited to this lower value.

FIGS. 6A & 6B illustrate the flowchart in connection therewith. At step S160 (Reset), a POWER UP RESET of microprocessor 72 is carried out at turn-on.

In step S162, a Commutation Counter (CC) in microprocessor 72, symbolically indicated in FIG. 5, is set to CC=0. Similarly, a Loop Counter (LC), also indicated symbolically, is set to LC=0. A "blocking" flag signal is cleared to 0; if the motor blocks, this flag signal changes to "1" after a certain time.

Step S164 checks whether the blocking flag signal=0. If this is the case, in step S166, closing of switch 126 (FIG. 5) sets RC1 to "0", and, in step S168, at an instant $t_1$ (FIG. 6A, right side), the motor current i in motor 30 is switched on. This occurs in accordance with FIG. 3, i.e. whenever, for example, rotor 35 is in a position between 0° and 60° el., the signals T1 and B2 are set to "1", and transistors 52 and 62 therefore turn on, as previously described in detail. In this step S168, there is also an evaluation of three Hall sensor output signals H1, H2, and H3, in order to turn on the motor in the correct manner.

In step S170, the commutation counter CC is checked, to see if 25 commutations have been carried out, i.e. whether rotor 35 has already made two complete turns. If this is the case, the current limitation first goes into effect, and in step S172, the commutation counter is kept at the count value CC=25, so that it does not count up indefinitely.

In step S173, a slight time delay is carried out by using NOP (NO Operation) instructions. Subsequently, in step S174, a test is carried out, to see whether motor current i has exceeded the preset limit, i.e. whether signal RCO="1". If yes, in step S176 at instant $t_2$ (FIG. 6A, right side) the signals B1, B2 and B3 are made="0", i.e. the lower bridge transistors 60, 62, and 64 are turned OFF.

Due to the steps S170, S172, S173 and S174, there elapses, between step S168 and step S176, a time interval τ of e.g. 10 μs, i.e. whenever the current i is shut off in step S176, it has already flowed for at least this period τ.

If it is determined, in step S174, that the current limit has not been exceeded, the motor current is not interrupted, and the program goes to step S180. This effects a time delay and can consist of, for example, multiple NOP instructions.

In step S182, there is a new test as to whether the current limit has been exceeded. If yes, in step S184, the motor current i is interrupted by making lower bridge transistors 60, 62, and 64 non-conductive at instant $t_3$.

Then the program continues to step S186 which, like step S180, effects a time delay, and can be composed of NOP instructions. Naturally, in step S180, calculations for control processes etc. could take place, which likewise consumes time. After step S186 comes step 188 (FIG. 6B), where there is a new test as to whether the current limit has been exceeded (just as in steps S174 and S182). If the current limit has just now been exceeded, in step S190 the motor current i is interrupted by making the lower bridge transistors 60, 62, and 64 non-conductive at instant $t_4$ (FIG. 6B, top right).

There is a subsequent step S194 in which (analogously to steps S180 and S186), a program running time is created, i.e. a delay, for example by means of NOP instructions.

No Current Limitation Directly After Startup

According to a preferred variant, which need not be used, one proceeds as follows: If it is determined in step S170 that the count state of commutation counter CC is smaller than 25, the program branches to step S196, where a corresponding delay time can be created by NOP instructions, and the program goes thereafter directly to the output of step S194, jumping over all steps with current limitation, so that, directly after start-up, the maximum possible torque of motor 30 is generated, and the current is not limited. After the completion of two rotations, there is an automatic switchover to current limitation.

Directly after the start-up of the motor, it is not necessary for the loop counter LC to count exact values, since these values are not necessary for speed control; the motor is going too slowly, anyway. Thus, in this case, one can omit step S196, the creation of a delay by NOP instructions, without changing anything about the functioning of the motor. In this case, the time consumed by a program loop execution is reduced, since the instructions of S170 to S194 are not executed, and the loop counter LC thus indicates values which are too high.

One should also note that, using the count value retrieved in step S170, one can ascertain whether, for example, current limitation sets in already after a half-rotation of the motor, or after a full rotation, after two rotations, etc. This depends upon what drive task the motor has. If the motor 30 drives a device via a gear so that, for example, 200 rotations of the motor correspond to a single rotation at the output of the gear, one would suspend current limitation, as shown in FIG. 6, e.g. during the first two rotations of the motor after turn-on, so that the motor can reliably start rotating.

In step S198, the loop counter LC is incremented by the value 1. The loop counter LC counts how often, between two successive commutations, the loop designated in FIG. 6 as S200 is executed, for example in FIG. 3 between the angular positions 0° el. and 60° el., or between 60° el. and 120° el., or between 120° el. and 180° el., etc. The contents of loop counter LC thus represents a measure for the time which rotor 35 requires for a 60° el. rotation. In order to achieve this, corresponding NOP instructions are used to adjust all loop execution runs or "coursing times" regardless of path taken, to the same duration, e.g. uniformly to 54 μs. One attempts, in this invention, to make this cycle time or loop time as short as possible, so that a high frequency results. A cycle time of 50 μs corresponds to a frequency of 20 Khz, which is above the humanly perceptible range. In particular cases, one can make exceptions from this basic rule of uniform loop execution time, e.g. when momentarily no current limitation is needed, because the current is shut off for other reasons, or because no current limitation is being performed.

Step S206 tests whether one of signals H1, H2, or H3 has changed. Such a change means that rotor 35 has, with respect to the preceding change of one of these signals, advanced along an angular path of 60° el., and that the currents through stator windings 31, 32, 33 must be changed in accordance with the new rotor position, i.e. a switchover must take place in the full bridge circuit 94. Such a switchover is designated in electrical machinery technology as "commutation."

To the extent that a change in one of signals H1, H2, H3 has occurred, this is a reliable indication that motor 30 is running, and thus in step S208, the loop counter LC is set back to 0, and therefore begins to count up again from this commutation point. Since a commutation has occurred, the commutation counter CC is incremented by the value 1 (insofar as this has not already reached the value 25, at which it is held). Also, in step S208, various control processes and calculations for the commutation occur. This is described in co-pending German patent application P 44 41 372.6 and in co-pending U.S. Ser. No. 08/638,916, RAPPENECKER, filed Apr. 25, 1996 (U.S. attorney docket 46310-1446MO). These disclosures are incorporated by reference herein.

It is to be noted that the calculation processes in step S208 can require a relatively long time, e.g. 150 $\mu$s, while a loop execution otherwise—if step S208 were not executed—in the case of current limitation would consume only an exactly determined time $T_c$ which in the normal case is substantially shorter than 150 $\mu$s.

Since the processes in step S208 occur each time that a commutation is supposed to happen, this long calculation time disturbs nothing, since it results, in practice, in a—desired—small current gap surrounding the commutation. Preferably, a rotational speed controller, if present, regularly interrupts the current already before the commutation.

The execution of loops S200 with normal duration, and thus the aforementioned elapsed time measurement between two commutation instants by means of loop counter LC, thus begins, due to these calculations in step S208, not directly at the instant of a commutation, but rather with a slight delay. The content of this loop counter LC is thus, due to this circumstance, slightly smaller than the temporal interval between two commutation instants, which in practice disturbs nothing and has no influence. This is also particularly pointed out here because the loop execution through step S208 takes significantly longer than a "normal" loop execution with current limitation which, due for example to NOP instructions, has an exactly determined duration, e.g. 54 $\mu$s.

If it is ascertained in step S206 that no commutation has taken place, the program goes to step S210 and tests whether the loop counter LC has reached a time of one second. If, e.g. the time taken for a loop S200 is about 50 $\mu$s, this means that over 20,000 loops S200 have been executed, without a commutation having occurred, i.e. one must conclude that rotor 35 is blocked and cannot turn. Therefore, in this case, in step S212, the "blocking" flag (see step S164) is set to "1" which indicates to the program logic that the motor is blocked.

Subsequent to step S212, the program goes (via loop S200) back to step S164. There, whenever the blocking flag=1, branching to step S214 occurs, which tests whether RBO="0". RBO is the terminal 10 of $\mu$P 72, which can be set to either "0" or "1" by means of switchover element 120.

If RBO=0, in the following step S216 the lower bridge transistors 60, 62, and 64 are turned off, while B1, B2 and B3 are set equal to 0. The motor is then currentless, but periodic attempts are made to see if it will start; see description below. Subsequent to program step S216, the program goes to step S170, i.e. step S168 is not executed here, and the motor current is not turned on.

If RBO="1", i.e. switch 120 is in its upper position, the program goes to step S220, i.e. the switch 126 in $\mu$P 72 (FIG. 5) is opened by the program, so that terminal 19 (RC1) becomes high impedance. This has, as previously described, the consequence that the upper limit value of current for triggering current limitation is lowered, e.g. from 350 mA to 150 mA. In this case, even during a blocking of rotor 35, a current would be maintained at, e.g. 150 mA, so that the motor would generate a torque even at standstill, but not enough to overheat. Such a torque is needed for some applications, e.g. for positioning of damper flaps.

Subsequent to step S220, the program goes to step S168, where the current in the motor is turned on again, insofar as it was previously interrupted at one of the instants $t_2$, $t_3$, or $t_4$.

Going back to FIG. 6B, to the extent that step S210 ascertains that loop counter LC does not contain the value 1 second, the program goes to step S224 and there tests whether the loop counter LC contains the value 10 seconds, i.e. tests whether the motor has been stationary already for 10 seconds. If so, the program goes to step S226. There the blocking flag is set to "0" and so is the loop counter LC, so that the motor makes a new starting attempt with full current.

The time value in step S224 can naturally be varied within quite wide limits. Insofar as RBO="1", i.e. the motor is generating a torque even at standstill, it suffices if a start attempt with full motor current is made, e.g. only once every complete hour or only every second hour, and the test value in step S224 is then adjusted to, e.g., 3600 seconds or 7200 seconds.

Subsequent to step S212 or step S226; the program goes via loop S200 back to step S164, i.e. the loop is newly executed.

Insofar as the current limitation should be effective directly from the start of the motor, step S170 is omitted.

Figure 7A:
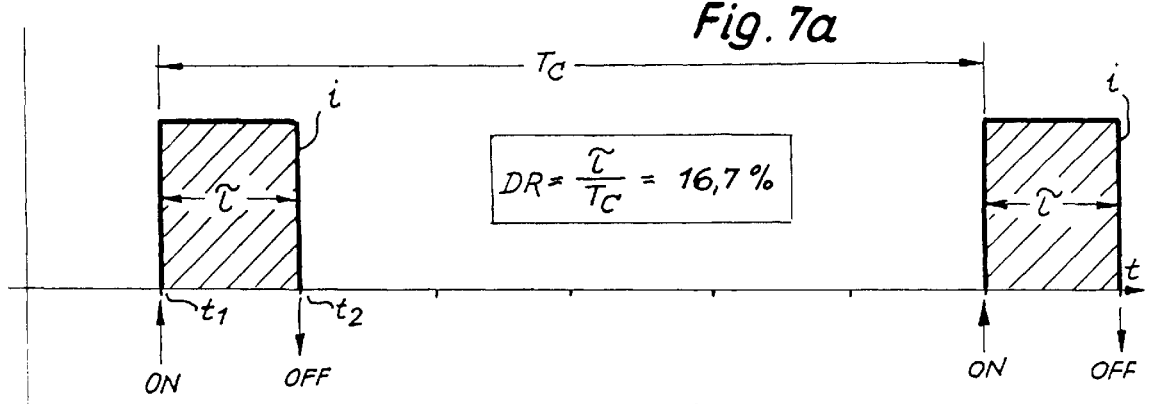

FIG. 7a illustrates the current pattern, if the motor current is high, i.e. at instant $t_1$ the current i is turned on, and, since at instant $t_2$ (the time of the test or interrogation at step S174) the current has already exceeded the predetermined value, it is promptly shut off after the time span $\tau$, e.g. 10 $\mu$s.

Loop S200 with the complete time duration $T_c$ (e.g. 60 $\mu$s) is now executed, and not until the beginning of the next loop execution is the current i turned on again, in step S168.

One thus obtains short current pulses with a duty ratio DR of e.g. 16.7% and, assuming a loop duration of 60 $\mu$s, a frequency of 16.6 kHz.

Figure 7B:
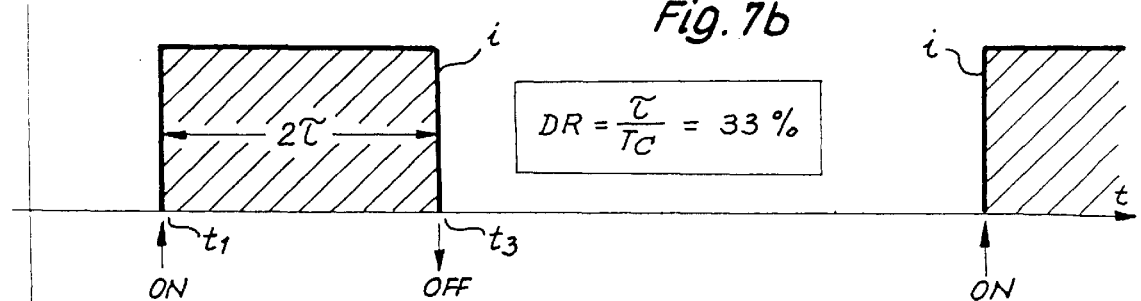

FIG. 7b illustrates the case in which the current in the motor is not as high and, after the turn-on at instant $t_1$, does not exceed the predetermined limit value until instant $t_3$, thus before or at the time of the check in step S182. In this case, the current flows for an interval of $2\tau$ (e.g. 20 $\mu$s) and this is followed by a currentless period of $4\tau$ (e.g. 40 $\mu$s), so that the duty ratio DR here approximates 33%.

Figure 7C:
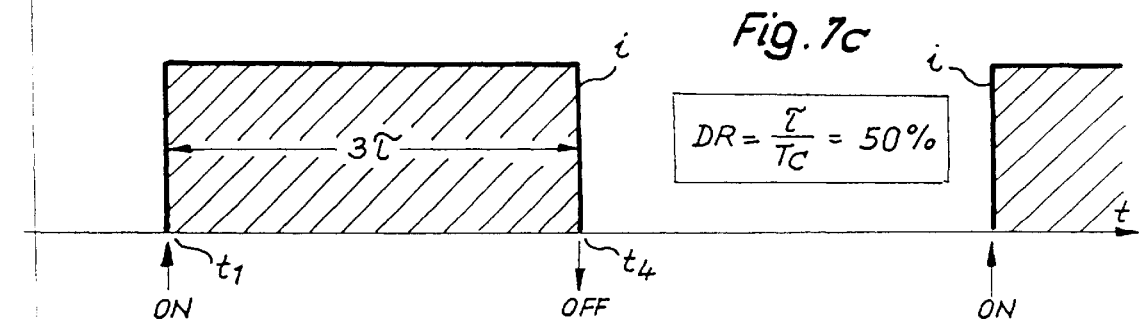

FIG. 7c illustrates the case in which the current in the motor climbs even less strongly and, after turn-on at instant $t_1$, does not exceed the predetermined limit value until instant $t_4$, thus before or at the time of the check in step S188, at which time it is shut off.

Here, in this example, the result is a duty ratio DR of 50%, i.e. the current flows only during half the total time. Here, also, the frequency approximates 16.6 kHz, since nothing changes about the cycle time $T_c$ which is required to execute a loop S200.

Figure 7D:
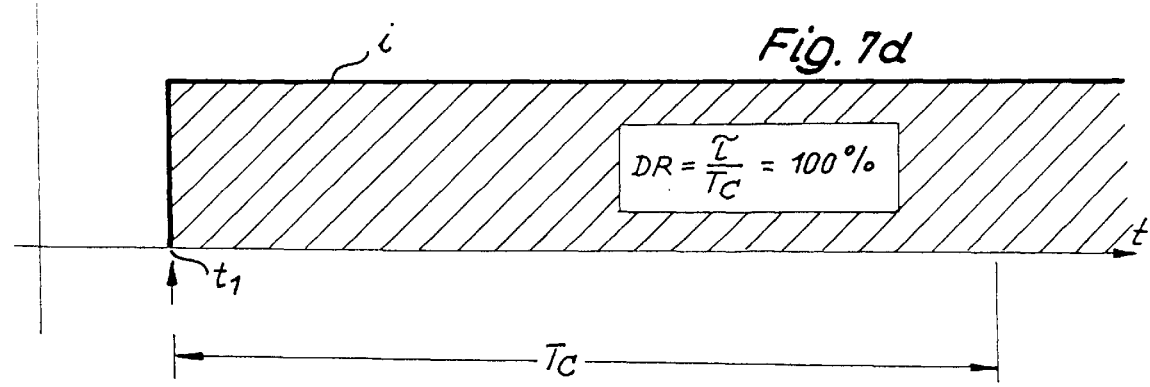

FIG. 7d illustrates the case in which the motor current i, after the turn-on at instant $t_1$, does not ever exceed the predetermined limit value, and therefore remains constantly turned on, i.e. the duty ratio DR in this case is essentially 100%.

One thereby obtains, through the invention, a pulse-width modulation (PWM) kind of current limitation, thus a current limitation with pulse width modulation, and in which the duty ratio does not vary continuously, but rather in jumps.

If one omits steps, e.g. S188 and S190, one obtains only the duty ratios according to FIGS. 7a, 7b, and 7d. One can, in this case, make the time $\tau$ greater with respect to $T_c$. The dimensioning of the values for $\tau$ and $T_c$ will naturally be specified by the person who adapts the motor for a specific application.

By addition of further tests, one can also generate other duty ratios, but in practice this reaches its limits because the value for $T_c$ goes too high, i.e. the frequency of the current pulses becomes too low, so that it falls in the humanly perceptible audio range, which is undesirable.

The invention is particularly advantageous in combination with a rotation speed (RPM) controller. In such a controller, the RPM is controlled by turning on the current through a motor winding only after lapse of a time interval following a commutation instant. Whenever the motor is too slow, this time interval is made small, and whenever the motor is too fast, the interval is made large. One thus obtains, for a desired RPM, only relatively short current pulses.

By the current limitation process of the invention, one can "spread apart" these short current pulses. This is shown schematically in FIG. 8. There, two successive commutation instants are designated K1 and K2. The motor current in one strand is designated i. This begins, in FIG. 8a, only after lapse of a delay time DT from the commutation instant K1.

If the motor current is limited in accordance with the inventive method, there begins, as shown in FIG. 8b, a (smaller) current right after lapse of a short delay time DT1, measured from K1, and the current i is turned continuously ON and OFF, as indicated only symbolically at 230. This is much more advantageous for the efficiency of the motor, and also leads to fewer motor noises and to a reduced ripple in the resulting torque.

It is to be noted that, due to the high frequency of the current pulses, these cannot be correctly represented in FIG. 8b, i.e. FIG. 8b is only a schematic illustration of the principle, which one could call "motor current pulse stretching" or "current thinning" to make it more comprehensible.

One could also use such motor current pulse stretching automatically, if otherwise the motor current pulses would become very short, since that would also be undesirable, because the motor current would no longer be flowing in those time intervals, in which the induced voltage has its maximum. The turning rotor 35 induces, in the stator strands 31, 32, 33, a voltage, which is known as "induced voltage" or "counter EMF". This has, in modern motors, usually a trapezoidal form. The motor current should, in this case, only be turned on when this induced voltage, in the strand to be turned on, is in the ranges of its maximum, since otherwise the efficiency of the motor becomes poor. Therefore, the invention improves efficiency significantly, specifically in motors with such RPM controllers and also reduces noise formation, since the ripple of the torque becomes smaller.

Naturally, within the scope of the present invention, many variations and modifications are possible. So, for example, it is not necessary in FIG. 7 that the pulse lengths be exact multiples of the duration $\tau$. For example, the pulse lengths could be $\tau$ in FIG. 7a, 2.5 $\tau$ in FIG. 7b, and 3.8 $\tau$ in FIG. 7c.

For example, in normal operation of the motor, i.e. after the run-up, practically only the pulse forms shown in FIGS. 7a and 7b occur, so that, in this case, the steps S188 and S190 of the flowchart (for the third test of the motor current) are not needed. One can therefore, when the motor is running at normal speed, e.g. its controlled RPM, substitute for steps S188 and S190 other calculations, e.g. the synthetic calculation of a sensor signal, as described in German application 195 17 665.0 of May 13, 1995 and corresponding U.S. Ser. No. 08/638,916, RAPPENECKER, filed Apr. 25, 1996 (Attorney docket 46310).

Conversely, in case of a blocked motor (and reduced command value of the motor current due to switchover of RC1 to high impedance), there occur also the pulse forms of FIG. 7c, and there the steps S188 and S190 are useful, while the "synthetic" generation of a sensor signal can be omitted. One can thus perform, depending upon the operating state, instead of steps S188, S190 (for the third test of the motor current), other program steps, in order to, in this manner, keep the cycle time $T_c$ as short as possible and the frequency of the current limitation as high as possible. These and other changes lie within the competence of those skilled in the art of tailoring such a current limitation for a specific motor and a specific driving task. Therefore, the invention is not limited to the particular embodiments shown and described, but rather is defined by the following claims. For example, features of one embodiment could be combined with features of another embodiment.

What is claimed is:

1. A method of current limitation in a direct current motor having a respective switch which controls current flow in a respective winding strand of the stator of the motor, comprising the steps of during each of successive operating cycles having an essentially constant duration ($T_c$) of less than one second, switching on motor current (i) at a predetermined instant ($t_1$) of each cycle;

checking motor current, with respect to a predetermined limit value, in a first test (S174) performed at a predetermined time interval ($\tau$) after said switching on, and interrupting (S176) said current if it exceeds said limit value;

checking motor current in a second test (S182) performed in the same cycle at a predetermined time interval after said first test, and, insofar as said current is still flowing, interrupting said current if it exceeds a predetermined limit value;

insofar as said current was interrupted at either of said first and second tests, switching said motor current back on after lapse of a predetermined time interval measured from said second test; and repeating the foregoing steps in successive cycles.

2. The method of claim 1, further comprising the step of performing a third test (S188) of motor current in each cycle, a predetermined time interval after said second test and before said switching-back-on step, and interrupting said motor current at said third test if it exceeds a predetermined limit value.

3. The method of claim 1, wherein said time intervals between current switch-on and said first test, and between said first test and said second test, have substantially the same duration.

4. The method of claim 2 wherein said time intervals between current switch-on and said first test, between said first test and said second test, and between said second test and said third test, have substantially the same duration.

5. The method of claim 1, wherein, in order to facilitate motor start-up with maximal current and maximal torque, current limitation is disabled directly after switch-on of the motor by measuring at least one of rotational angles rotated and time elapsed since switch-on, and suspending said interrupting steps until a predetermined value has been measured.

6. The method of claim 1, further comprising the step of setting said limit value of motor current, at which motor current is interrupted subsequent to said test(s), as a function of an operating condition of said motor.

7. The method of claim 6, further comprising the steps of detecting when a rotor (35) of said motor is stationary and reducing said limit value of motor current during said stationary state (S214, S220).

8. The method of claim 1 further comprising the steps of detecting when a rotor (35) of said motor is stationary and switching off said motor current during said stationary state.

9. The method of claim 7, further comprising the step of making attempts (S224) to restart said motor at predetermined intervals.

10. A method of current limitation in a direct current motor having a respective switch which controls current flow in a respective winding strand of the stator of the motor, comprising the steps of during each of successive operating cycles of essentially constant duration ($T_c$), switching on motor current (i) at a predetermined instant ($t_1$) of each cycle;

checking motor current, with respect to a predetermined limit value, in a first test (S174) performed at a predetermined time interval ($\tau$) after said switching on, and interrupting (S176) said current if it exceeds said limit value;

checking motor current in a second test (S182) performed in the same cycle at a predetermined time interval after said first test, and, insofar as said current is still flowing, interrupting said current if it exceeds a predetermined limit value;

insofar as said current was interrupted at either of said first and second tests, switching said motor current back on after lapse of a predetermined time interval measured from said second test; and repeating the foregoing steps in successive cycles, wherein said duration ($T_c$) of each cycle is shorter than 100 microseconds, in order to obtain current limitation with a current pulse frequency of at least 10 kHz.

11. The method of claim 10, wherein said cycle duration is shorter than 50 microseconds, in order to obtain a current pulse frequency of at least 20 kHz.

12. A direct current motor (30) having a control circuit which measures current (i) flowing through said motor and which includes a current limitation circuit (72, 132, 142) which becomes effective when said current exceeds a predetermined limit value, wherein the current limitation circuit operates cyclically;

within each cycle of current control, the circuit performs a first current level test at a first instant ($t_2$) a predetermined time ($\tau$) after a switch-on time ($t_1$) and, if said current exceeds a predetermined limit value, interrupts the flow of current;

at a second instant ($t_3$) within said cycle, a predetermined time interval after said first current level test, the circuit performs a second current level test and, if said current exceeds a predetermined limit value, interrupts the flow of current; and at a third instant ($t_4$), a predetermined time interval after said second current level test, the circuit turns motor current back on, if it was previously interrupted, and begins a new operating cycle.

13. A motor according to claim 12, further comprising a detector for blockage of a rotor (35) of said motor, and a current reduction device which responds to an output signal of said detector to reduce at least one of said predetermined current limit values.

14. A motor according to claim 12, further comprising a detector for blockage of a rotor (35) of said motor, and a current shutoff device which responds to an output signal of said detector.

15. A motor according to claim 13, further comprising a restart device which attempts to restart said motor after lapse of a predetermined span of time after detection of blockage of said rotor (35).

16. A motor according to claim 14, further comprising a restart device which attempts to restart said motor after lapse of a predetermined span of time after detection of blockage of said rotor (35).

17. A motor according to claim 12, wherein each cycle of current control has a duration of less than one second.

* * * * *